United States Patent
Ohl et al.

(10) Patent No.: US 8,106,788 B2
(45) Date of Patent: Jan. 31, 2012

(54) SENSOR AND METHOD FOR OBTAINING DATA

(75) Inventors: Christian Ohl, Pfullingen (DE); Boris Adam, Gaeufelden (DE)

(73) Assignee: Robert Bosch GmbH, Stuttgart (DE)

( * ) Notice: Subject to any disclaimer, the term of this patent is extended or adjusted under 35 U.S.C. 154(b) by 565 days.

(21) Appl. No.: 12/299,813

(22) PCT Filed: May 22, 2007

(86) PCT No.: PCT/EP2007/054911
§ 371 (c)(1),
(2), (4) Date: Nov. 6, 2008

(87) PCT Pub. No.: WO2007/141132
PCT Pub. Date: Dec. 13, 2007

(65) Prior Publication Data
US 2009/0102674 A1    Apr. 23, 2009

(30) Foreign Application Priority Data
Jun. 9, 2006   (DE) .......................... 10 2006 026 879

(51) Int. Cl.
*G08B 21/00* (2006.01)
(52) U.S. Cl. ............................ 340/669; 340/439; 701/99
(58) Field of Classification Search .................. 340/669, 340/500, 438, 439, 441, 449, 451, 517, 521, 340/665; 701/1, 70, 99, 110
See application file for complete search history.

(56) References Cited

U.S. PATENT DOCUMENTS

| | | | |
|---|---|---|---|
| 5,337,367 A | 8/1994 | Maeda | |
| 5,479,096 A | 12/1995 | Szczyrbak et al. | |
| 6,175,787 B1 * | 1/2001 | Breed | 701/29 |
| 7,557,693 B2 * | 7/2009 | Zhu | 340/438 |
| 2002/0004694 A1 * | 1/2002 | McLeod et al. | 701/29 |
| 2005/0204820 A1 | 9/2005 | Treiber et al. | |

FOREIGN PATENT DOCUMENTS

| | | |
|---|---|---|
| JP | 5-328480 | 12/1993 |
| JP | 2000-209225 | 7/2000 |
| JP | 2005-238893 | 9/2005 |
| WO | 98/20615 | 5/1998 |

OTHER PUBLICATIONS

International Search Report of Application No. PCT/EP2007/054911, dated Oct. 31, 2007.

* cited by examiner

*Primary Examiner* — Toan N Pham
(74) *Attorney, Agent, or Firm* — Kenyon & Kenyon LLP (57) ABSTRACT

A sensor for obtaining data is described, including at least one sensitive module for quantitatively detecting a parameter to be determined, at least one data transmitting unit for transmitting the obtained data, and at least one signal path between the sensitive module and the data transmitting unit, also including a control logic unit which defines at least one transmission parameter of the signal path and/or of the data transmitting unit, as a function of at least one output variable of the sensitive module, and an associated method.

20 Claims, 5 Drawing Sheets

SENSOR AND METHOD FOR OBTAINING DATA

FIELD OF THE INVENTION

The field of the invention relates to a sensor for obtaining data, including at least one sensitive module for quantitatively detecting a parameter to be determined.

BACKGROUND INFORMATION

Sensors are used in motor vehicles to detect various parameters and to transmit data to an analyzer unit. The sensors used include at least one sensitive module, which converts at least one physical and/or one chemical parameter, depending on a state relevant for operation of the vehicle, which may be into an electrical quantity. In addition, the sensors usually include a circuit for initial processing of the quantity thereby obtained and providing a sensor output signal, which may be digital, on a data transmitting unit.

The sensor output signal is transmitted from the data transmitting unit to an analyzer unit, e.g., to a control unit. This analyzer unit has at least one data receiving unit, which is connected via a suitable transmitting arrangement to the data transmitting unit of the sensor.

Information contained in the electrical quantities obtained internally in most sensors definitely exceeds the information demand for protecting certain applications. At the same time, the transmission path between sensors and control units, e.g., in the form of a peripheral sensor interface (PSI) having a transmission capacity of 125 kbps, constitutes a bottleneck in the flow of information.

For this reason, only a subset of the maximum available information is usually sent from the sensor to the control unit. However, care must be taken to ensure that the greatest possible amount of information relevant for the particular function that is to be implemented by the control unit or the connected systems does in fact reach the data receiving unit of the control unit. This is true to a particular extent when a sensor contains multiple sensitive modules or is even designed as a so-called combination sensor having sensitive modules for detecting different physical and/or chemical parameters.

It is therefore known that sensors may be equipped with an analyzer circuit, which essentially provides a data volume that has been processed according to fixed specifications to the data transmitting unit. To this end, the electrical output quantity of the sensitive module is applied to different circuit components which function as amplifiers, filters or other converters, for example, which may already perform complete digital data processing. These circuit components form a signal path between the sensitive module of the sensor and the data transmitting unit. If a signal travels along this signal path, components for a data word, which is applied to the data transmitting unit and may be retrieved for further processing outside of the sensor, are extracted from the output variable of the sensitive module in a fixedly predefined manner.

It is also known that a sensor may be equipped with several such signal paths, which are selected depending on the particular function to be implemented by the control unit and which differ with regard to the type and manner in which the data word applied to the data transmitting unit is obtained. This procedure constitutes a selection among methods regulated in advance for data reduction.

In the case of combination sensors, it is also known that communication of the sensor with a control unit or other system components may be handled via multichannel-capable interfaces or multiple separate interfaces. However, relatively large data volumes are transmitted to ensure a high detection reliability of states to be monitored.

SUMMARY OF THE INVENTION

The exemplary embodiments and/or exemplary methods of the present invention includes a sensor for obtaining data, including at least one sensitive module for quantitatively detecting a parameter to be determined, at least one data transmitting unit for transmitting obtained data, and at least one signal path between the sensitive module and the data transmitting unit, a control logic unit also being included, defining at least one transmission parameter of the signal path and/or of the data transmitting unit as a function of at least one output variable of the sensitive module.

The exemplary embodiments and/or exemplary methods of the present invention also includes a method for providing an output signal of a sensor, including at least one sensitive module for quantitatively detecting a parameter to be determined, at least one data transmitting unit for transmitting obtained data, and at least one signal path between the sensitive module and the data transmitting unit, in which an output variable of the sensitive module is sent to a control logic unit; the control logic unit defines, as a function of this output variable of the sensitive module and/or as a function of a variable derived from this output variable at least one transmission parameter of the signal path and/or of the data transmitting unit; at least one output variable of the sensitive module being sent via the signal path to the data transmitting unit and at least one output data word, which contains information about the output variable of the sensitive module, is provided on the data transmitting unit for further transmission.

The control logic unit is designed in such a way that variables may be derived from the output variable of the sensitive module in the control logic unit itself and/or in various modules within the signal path between the sensitive module and the data transmitting unit and/or externally to the sensor. Additionally or alternatively, the control logic unit may receive other input signals via which it is possible to otherwise influence the transmission parameters that are to be defined according to the present invention. For example, programming of the control logic unit and/or a combination of the control logic unit with additional external control components is implementable in this way.

Transmission parameters of the signal path and/or of the data transmitting unit in the sense of the present invention are understood to also include selection parameters in the case of sensors having multiple sensitive modules and also the type of physical and/or chemical parameters detected in the case of combination sensors, thus making it possible to control which sensitive modules directly or indirectly supply information that is integrated into an output data word to be transmitted.

The transmission parameters are defined in such a way that the output variables of the sensitive module are weighted with respect to their relevance for corresponding applications and the supply of required data at the output of the data transmitting unit is adapted, so that the bandwidth made available for further transmission of data to a central analyzer unit, typically a control unit, may be optimally utilized for transmission of application-relevant information. Preselected signal components or derived variables may be transmitted.

Through the weighting of the sensor data or information derived therefrom via feedback according to the present invention, the defined transmission parameters may be adapted and optimized advantageously during operation.

In addition to optimum utilization of a predefined bandwidth, output signals of a sensor according to the present invention may also be made available in a different form for different applications. The number of required sensors may be reduced in this way. Time-discrete output signals and status information in digital form may be transmitted after being combined and adapted to the particular demand case.

The exemplary embodiments and/or exemplary methods of the present invention is suitable for operating individual sensors as well as multiple sensors and for transmitting sensor output signals over a jointly utilized transmission channel. The exemplary embodiments and/or exemplary methods of the present invention is likewise suitable for operating sensors having multiple sensitive modules. These may be similar sensitive modules, e.g., in multiaxial acceleration sensors, or different sensitive modules, e.g., in combination sensors for simultaneous measurement of pressures and accelerations.

The sensor concept according to the present invention is suitable in particular for use in combination with pressure and/or acceleration measurements, e.g., by micromechanical pressure sensors, acceleration sensors, or combination sensors for airbag systems.

In the cases mentioned, it is advantageous if the control logic unit and/or the data transmitting unit have/has an arrangement for providing data obtained from output variables of multiple sensitive modules jointly in one output data word. It is advantageous in particular if an arrangement is included which make it possible to set the word width, which is available in an output data word for providing the data obtained from the output variables of the individual sensitive modules. For example, output variables of a sensitive module for measuring accelerations may be included jointly with output variables of a sensitive module for measuring pressures in an output data word, the word width available for the individual output variables being variable and/or adjusted differently without having to change the total word width of the output data word.

The exemplary embodiments and/or exemplary methods of the present invention will now be explained in greater detail below, which may be on the basis of exemplary embodiments from the field of automotive passenger protection/airbag control, without being limited to these systems.

DETAILED DESCRIPTION

Figure 1:
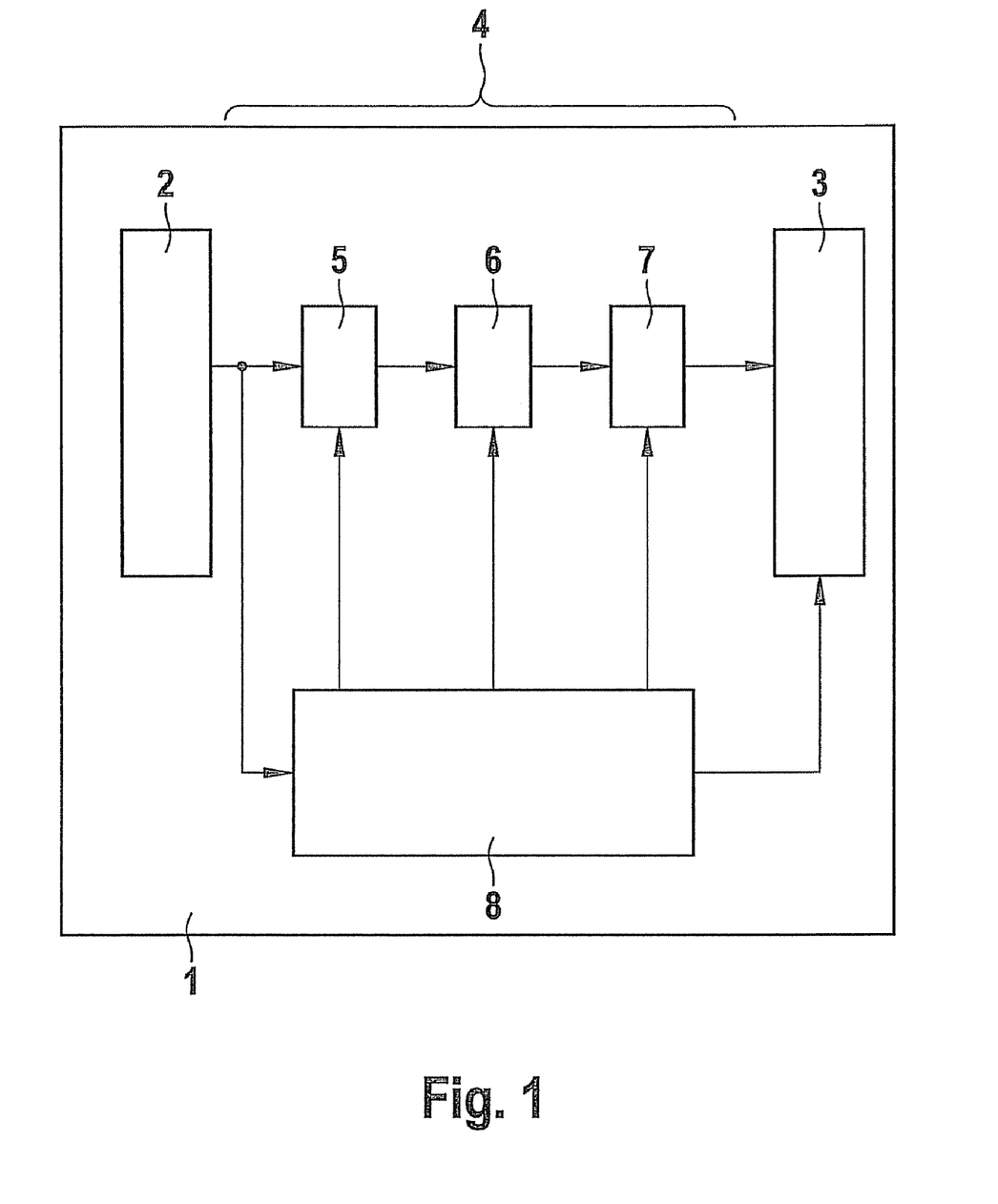
FIG. 1 shows a block diagram of the basic components of a sensor according to the present invention.

FIG. 1 shows a block diagram of the basic components of a sensor according to the present invention. Sensor 1 includes a sensitive module 2 for quantitatively detecting a parameter to be determined, a data transmitting unit 3 for transmitting obtained data, and a signal path 4 between sensitive module 2 and data transmitting unit 3. Signal path 4 includes an amplifier 5, a filter circuit 6 and a circuit for digital signal processing 7. In addition, according to the exemplary embodiments and/or exemplary methods of the present invention, this includes a control logic unit 8, to which an output variable of sensitive module 2 is sent, which analyzes this output variable and, as a function thereof, defines as transmission parameters of data transmitting unit 3 the amplifying factor, the filter characteristic and, if necessary, the type of digital signal processing as transmission parameters of signal path 4, and the type and manner of providing an output data word to the data transmitting unit, i.e., the word width and time cycles, for example. An output signal that has already been processed and/or preprocessed as a function of input variables is applied to data transmitting unit 3 and may thus be transmitted to a control unit for further processing.

Figure 2:
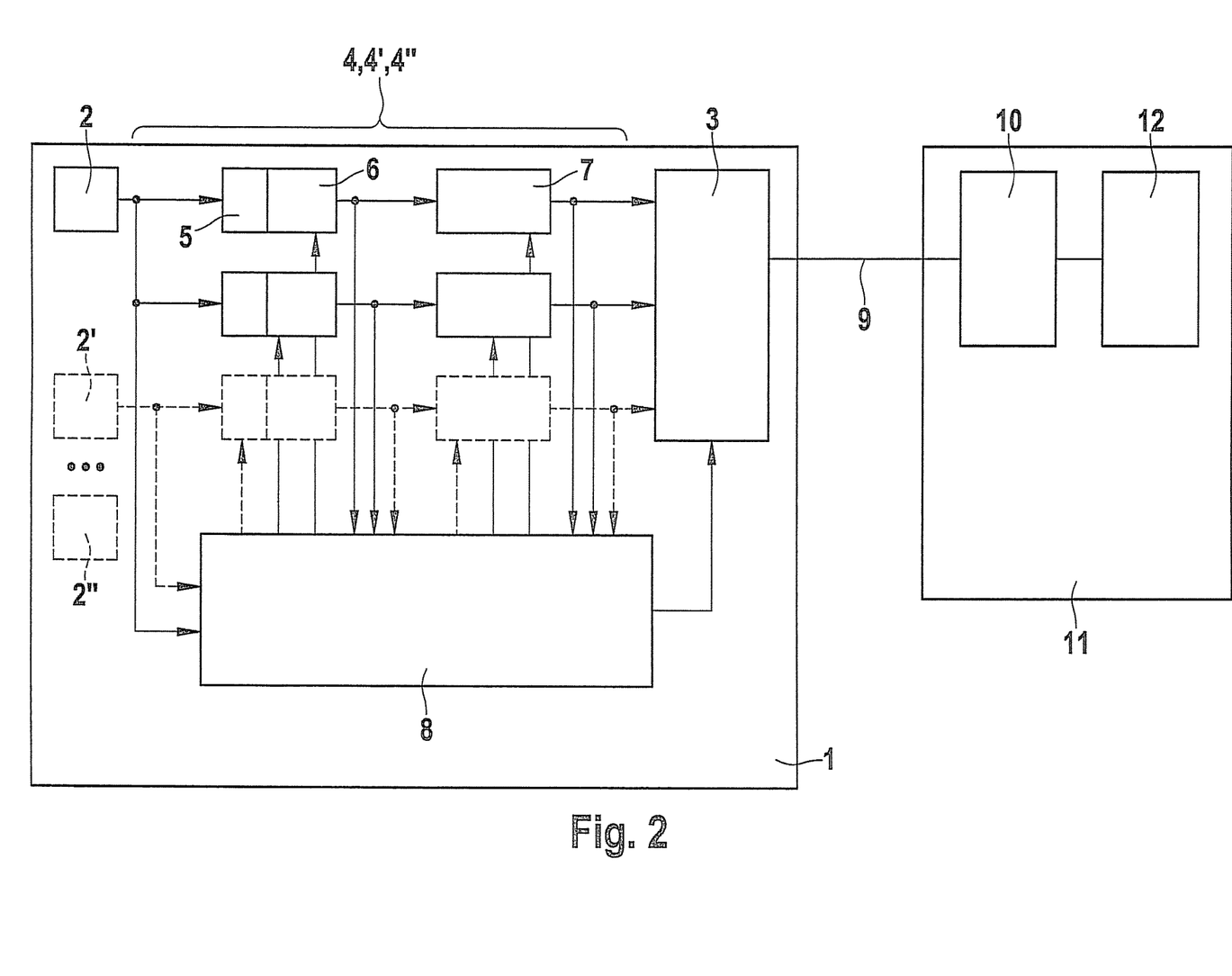
FIG. 2 shows a block diagram of a sensor according to the present invention having multiple sensitive modules.

FIG. 2 shows a block diagram of a sensor 1 according to the exemplary embodiments and/or exemplary methods of the present invention having multiple sensitive modules 2, 2', 2". The individual sensitive modules are each connected to a shared data transmitting unit 3 via at least one signal path 4, 4', 4", which is designed according to the example in FIG. 1. A shared control logic unit 8 controls amplifying factors, filter characteristics, the type and manner of digital signal processing of individual signal paths 4, 4', 4" and the type and manner of providing the output data words to data transmitting unit 3. To do so, output variables of sensitive modules 2, 2', 2" are sent to control logic unit 8 either directly or after various steps of preprocessing within signal paths 4, 4', 4". Signal processing also takes place in control logic unit 8 itself as a result of which criteria for control of the transmission parameters are derived and may additionally be sent directly to data transmitting unit 3. Data transmitting unit 3 is connected via a data line 9 of a fixed transmission capacity to a data receiving unit 10 of a control unit 11, in which a unit 12 for signal processing performs the final processing of the obtained data and controls connected systems. In the present example, sensitive module 2 is connected to data transmitting unit 3 via two parallel signal paths 4, 4'.

The transmission parameters may therefore be defined by simple switching between different signal paths using different preset transmission parameters. When using a peripheral sensor interface (PSI), the output data word may also be supplied in such a way that at a fixed transmission rate and a fixed word width, the data content of individual data words may be subdivided in variable ways. In the case of a 20-bit word width, for example, 4 bits may be used for header information, 4 bits for transmission of a low-resolution signal, and 12 bits for transmission of a high-resolution signal. If the control logic unit detects a state requiring another division, it is modified automatically. Alternatively, transmission formats having different data word widths or a variable combination of successive data words to blocks of different sizes are possible.

Figure 3:
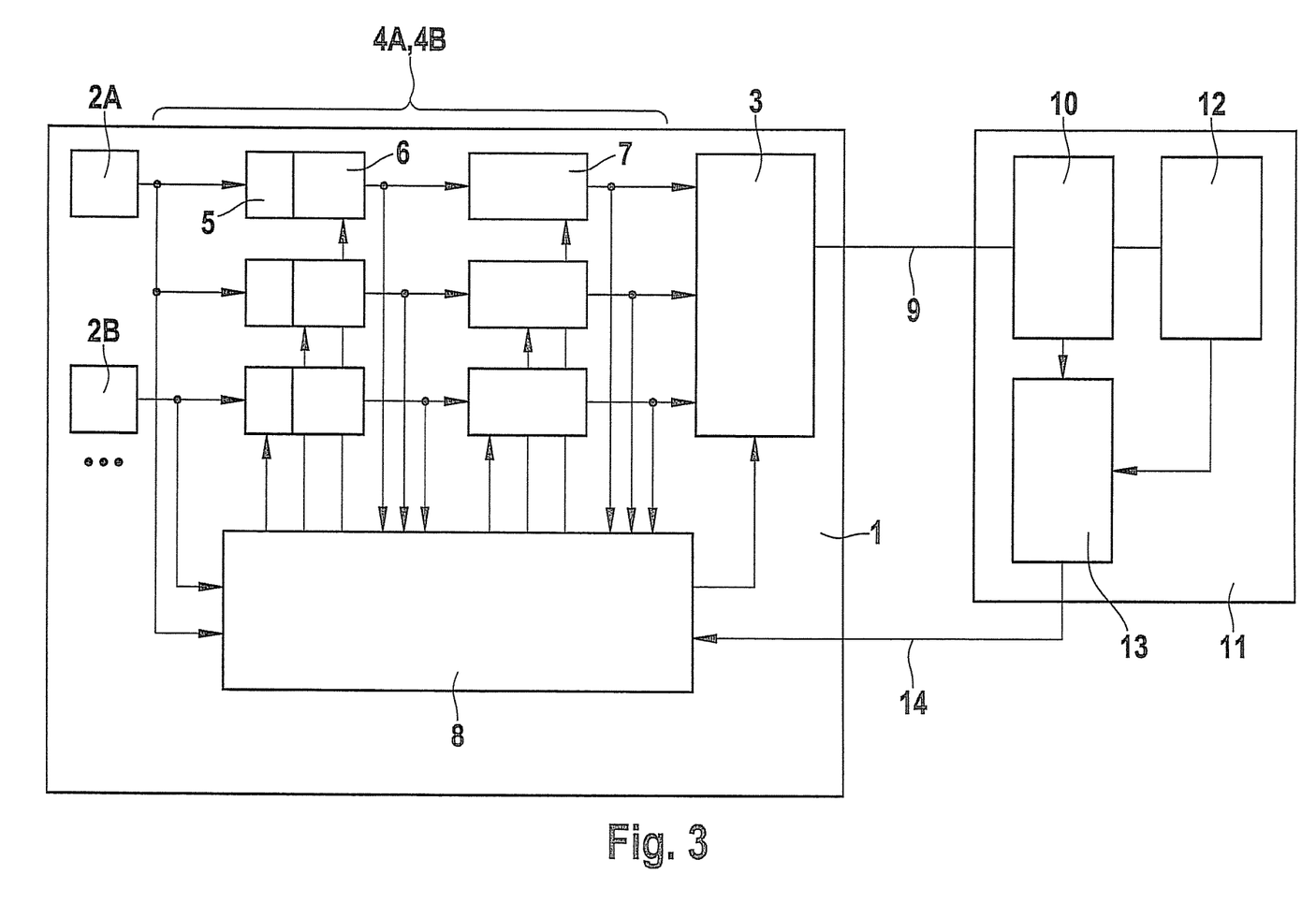
FIG. 3 shows a block diagram of a combination sensor according to the present invention having multiple sensitive modules.

FIG. 3 shows a block diagram of a combination sensor according to the exemplary embodiments and/or exemplary methods of the present invention having multiple sensitive modules. The individual sensitive modules, in the present case one sensitive module for pressure measurement 2A and at least one sensitive module for acceleration measurement 2B, are each in turn connected to a shared data transmitting unit 3 via at least one signal path 4A, 4B. As in the preceding examples, a shared control logic unit 8 controls amplifying factors, filter characteristics, the type of digital signal processing of individual signal paths 4A, 4B and the type and manner of providing the output data words to data transmitting unit 3. Data transmitting unit 3 is connected via a data line 9 of a fixed transmission capacity to a data receiving unit 10 of a control unit 11, in which unit 12 for signal processing performs the final processing of obtained data and controls connected systems. Another signal processing unit 13, which is provided inside control unit 11, processes the received signals to generate control signals that may be sent to control logic unit 8 via a data line 14.

This control signal functions as an additional input signal for control logic unit 8 and may thus influence the transmission characteristics of individual signal paths 4A, 4B. In addition, control signals generated in this way may be used for reprogramming the control logic during operation. Signal processing is also performed in control logic unit 8, as a result of which criteria for control of the transmission parameters may be derived and may additionally be sent directly to data transmitting unit 3. The functionality of control logic unit 8 is thus expanded by supplying a control signal from the control unit, which is advantageous in particular in processing complex data volumes such as those generated in combination sensors, for example. With combination sensors as in the present example, the type of physical and/or chemical parameters which are to be made available after being electrically converted to the form of the output data word may be selected by simply switching between different signal paths having the same or different preset transmission parameters. The output data word may also be provided in such a way that the data content of individual data words is subdivided variably at a fixed transmission rate and a fixed word width; information obtained by different sensitive modules may enter into one output data word even if these sensitive modules function to detect different physical and/or chemical parameters. Again in this case, it holds that in cases when a state requiring another division of the starting data word is detected by the control logic unit, it is modified automatically.

Figure 4:
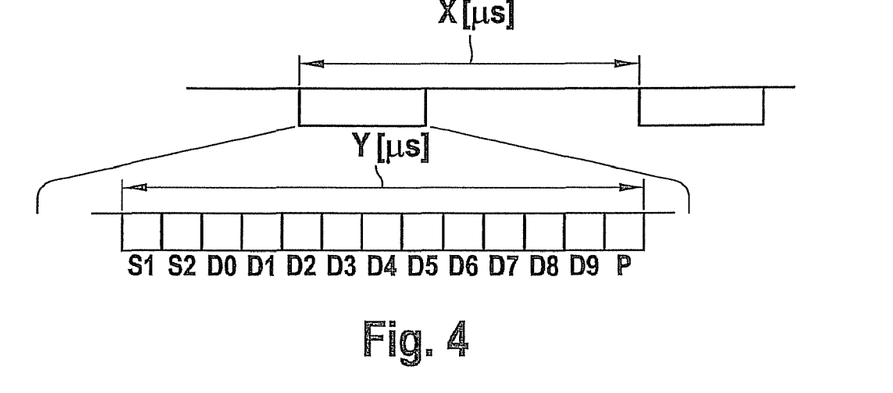
FIG. 4 shows a transmission diagram of an output data word after an inquiry to a sensor module.

FIG. 4 shows a transmission diagram of an example of an output data word after an inquiry to a sensitive module. Data transmission from the data transmitting unit to the control unit takes places serially in blocks, the transmission of which requires a transmission time Y within a transmission cycle X. Coding may be performed according to a Manchester code. The transmission begins with the transmission of two synchronization bits S1, S2 and is concluded by transmission of a parity bit P on the basis of which the correctness of the transmitted data word is verifiable. The transmitted data word also contains the actual information to be transmitted with respect to the parameter detected by a sensitive module, which is supplied within the output data word in the form of a 10-digit bit sequence D0 through D9. In this way, a 10-bit resolution is available to transmit parameters in a converted form, having been detected by a sensitive module, to a control unit.

Figure 5:
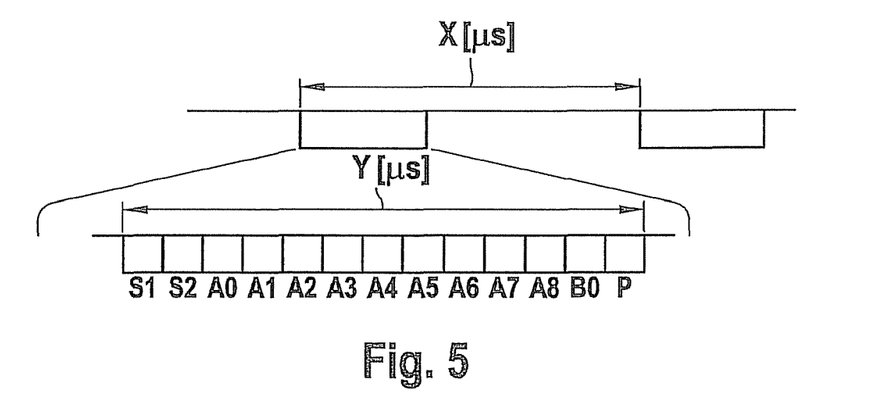
FIG. 5 shows a transmission diagram of an output data word after an inquiry to two sensitive modules.

FIG. 5 shows a transmission diagram of an output data word after an inquiry to two sensitive modules. As a result of quantitatively detecting two parameters to be determined by two different sensitive modules, preprocessed bit sequences are integrated after passage over the corresponding signal paths into the output data word as a function of the input variables, the output data word being able to be transmitted to a control unit for further processing. In this way, it is possible to transmit information, obtained by detection of parameters by multiple sensitive modules, in a single output data word without any time lag. The bandwidth required for this transmission may be divided in different ways as a function of specifications of the control logic unit. In the present example, the available range for transmission of 10 bits was divided asymmetrically in a 9:1 ratio. It is possible in this way to transmit quantitative information about a physical or chemical parameter with a 9-bit resolution in one output data word and at the same time to transmit quantitative information about another physical or chemical parameter detected by another sensitive module of the sensor according to the exemplary embodiments and/or exemplary methods of the present invention, the resolution in this case being 1 bit. Resolutions of 1 bit are suitable, for example, for transmitting threshold value information, such as that which may be advantageous for various plausibility check algorithms.

Figure 6:
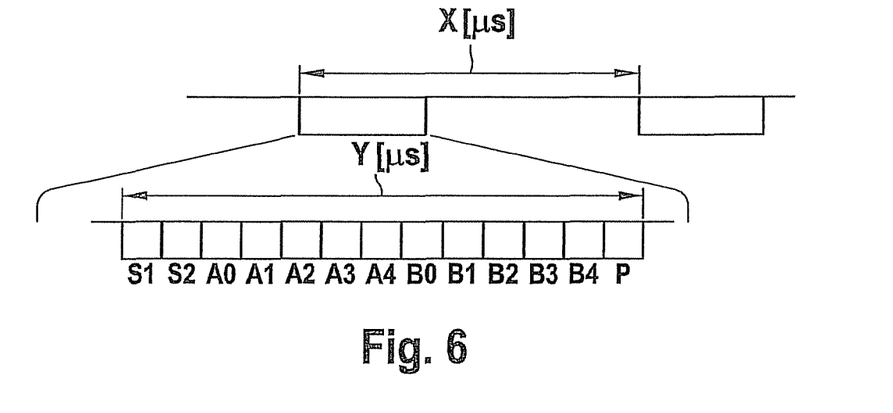
FIG. 6 shows an alternative transmission diagram of an output data word after an inquiry to two sensitive modules.

FIG. 6 shows an alternative transmission diagram of an output data word after an inquiry to two sensitive modules. In contrast with the example in FIG. 5, the division of the word width in the output data word available for the information transmission takes place symmetrically in a 1:1 ratio. Five bits are thus available for each of two items of quantitative information, which are made available by detecting two parameters by two sensitive modules of the sensor according to the present invention. In this way, several sensitive modules with the same, albeit relatively lower, resolution may be queried simultaneously. Transmission of relatively low data volumes is therefore necessary as long as a higher resolution is not necessary.

Figure 7:
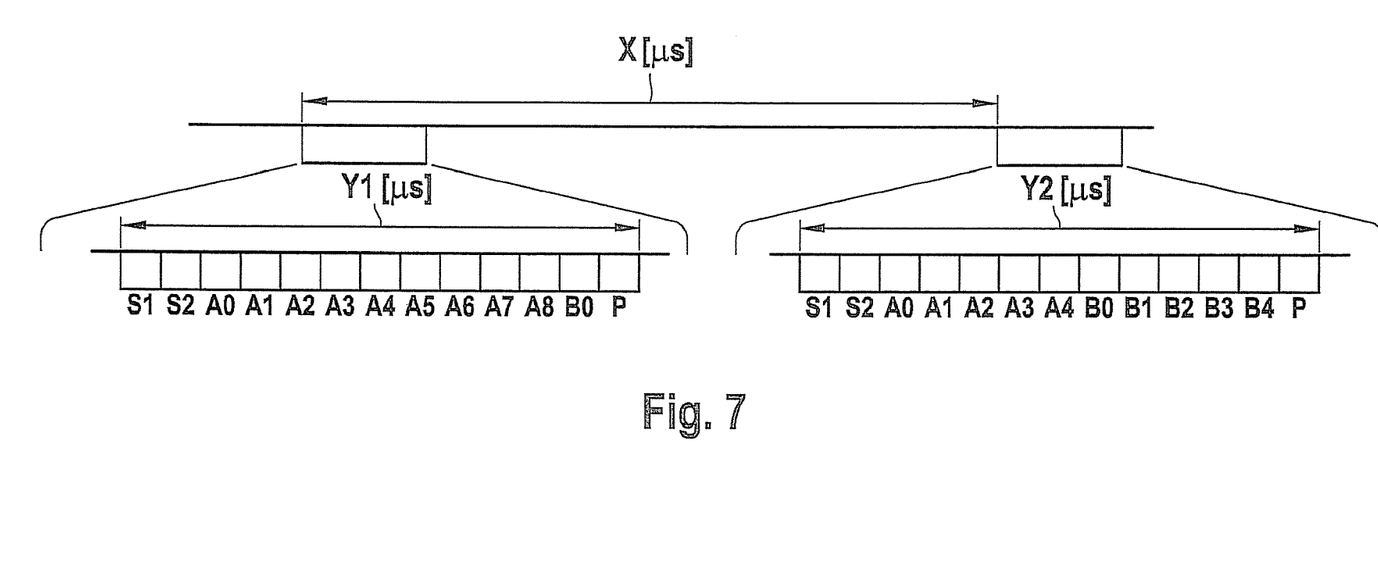
FIG. 7 shows a transmission diagram of successive output data words after an inquiry to two sensitive modules.

FIG. 7 shows a transmission diagram of successive output data words after an inquiry to two sensitive modules. Within transmission cycle X, one output data word is transmitted, requiring a transmission time Y. Between transmission of successive output data words, transmission parameters of the signal paths between the individual sensitive modules and the data transmitting unit may be modified by the control logic unit and/or the control unit in such a way that signal components to be integrated into the output data word are integrated with different resolutions into the data word. A first data word is transmitted in time window Y1. This contains quantitative information about parameters detected by two different sensitive modules, the information pertaining to a first parameter being transmitted at a 9-bit resolution, while the information pertaining to a second parameter in the form of a plausibility check is transmitted at a 1-bit resolution. If circumstances are detected in the wake of further signal processing, making it seem appropriate to make information about the parameter detected by the first sensitive module available at a higher resolution, then before transmission of the next following output data word, the division of the bandwidth available for the transmission is modified in such a way as to yield a symmetrical division, for example, resulting in 5 bits being available for transmission of the information pertaining to parameters detected by the two sensitive modules. In the same way, other division patterns are also conceivable; for example, a plausibility check bit may also be provided by the signal preprocessing of the signals of another sensitive module sent to the data transmitting unit. In this way, physical processes which are characterized by a change in physical parameters over time are detectable with high precision, and the parameter whose instantaneous change over time allows the best characterization of the physical process to be monitored at a certain point in time may be mapped into the input data word of the data transmitting unit with maximum resolution, the resolution being able to be automatically adapted to the particular requirements when there is a shift in significance relative to other parameters.

The exemplary embodiments and/or exemplary methods of the present invention is illustrated in greater detail on the basis of practical examples in which the sensors are designed as acceleration sensors in combination with pressure sensors in airbag systems, if necessary.

At least one acceleration sensor (y axis acceleration sensor) is used as a component of electronic stability program (ESP) systems. For error-free operation, an analysis of relatively low accelerations is required, but this must be performed at a high resolution. A control logic unit belonging to the sensor ensures that in standard operation at a corresponding signal amplification, there is cyclical delivery of the acceleration value ascertained by the sensitive module in the form of a data word to the data transmitting unit, the width of the data word being set at a high level. At the same time, within the control logic unit, the acceleration value ascertained by the sensitive module is monitored, e.g., by a threshold value comparison or by constant monitoring of an integral value of the ascertained accelerations via a concurrent time window. If a value that may be associated with a side crash is detected in such monitoring, the control logic unit causes the acceleration value ascertained by the sensitive module to be delivered to the data transmitting unit in the form of a data word with a lower amplification, a lower word width but a higher frequency. Therefore, higher-frequency signal components may be detected and transmitted to the control unit, and the patterns typical of the acceleration characteristic during a crash may be recognized and used to control an airbag system.

In the following exemplary embodiment, the analysis according to the exemplary embodiments and/or exemplary methods of the present invention of the signals of an xyz acceleration sensor is described. In the direction of the z axis of a vehicle, such a sensor detects low acceleration values, which may be used for the electronic stability program, i.e., for adjusting the suspension. Monitoring of acceleration values in the xy direction is used for crash detection. In normal accident-free operation, most of the bandwidth available for data transmission between the data transmitting unit of the sensor and the data transmitting unit of a control unit is claimed for transmission of the acceleration values in the z direction.

This means that the control logic unit causes a cyclical delivery of the acceleration value in the z direction ascertained by the sensitive module in the form of a data word in a resolution determined by the control logic unit to the data transmitting unit in such a way that transmission of these data words requires almost the entire bandwidth. Within the control logic unit, the acceleration values detected in the xy direction by the sensitive module are monitored and processed to yield status information. This status information describes the acceleration ascertained relative to a threshold value, e.g., 3 g. The status information requires only a very low bandwidth for its transmission if this information is to be transmitted to the control unit. If a crash situation is detected due to exceeding the threshold value, then the control logic unit prompts transmission of the z signal to be suppressed and the total bandwidth to be used for transmission of information that ensues from acceleration values ascertained in the xy direction or may be derived therefrom.

In the next exemplary embodiment, it is shown how the deployment performance of an airbag system may be improved by providing different resources for the transmission of sensor signals.

An acceleration sensor has a control logic unit, which is able to perform an analysis of the individual frequency components of the acceleration signal ascertained. The control logic unit is designed in such a way that it provides information derived from higher-frequency signal components with a high resolution and a window integral over low-frequency signal components as status information with a low resolution to the data transmitting unit. At the start of a serious crash, higher-frequency signals occur, induced by structure-borne noise, among other things, so the contact point in time may be determined relatively accurately. At the same time, monitoring of the window integral via the low-frequency signal components allows a rapid plausibility check because low-frequency signal components additionally occur to an increased extent in the remaining course of the crash due to the deceleration of the vehicle as a whole, depending on the installation site of the sensor. If a crash is diagnosed on the basis of monitoring the window integral via the low-frequency signal components, then the control logic unit causes a higher bandwidth to be used for transmission of the value of the window integral, so the control unit is capable of optimally determining the triggering time of the airbag. Transmission of the higher-frequency signal components is not necessary temporarily and therefore is suppressed or is prompted with a reduced bandwidth. This allows a better differentiation between crash situations and other interference accelerations, so that dangerous faulty deployment of airbag systems is preventable in some cases.

In the following exemplary embodiment, another form of a connection of acceleration sensors to a control unit according to the present invention is described. Acceleration sensors are used for side crash detection according to the principle described in the preceding example. An acceleration sensor on the crash side is used to ascertain the point in time of contact and the second sensor on the opposite side of the vehicle is used as a "remote sensor" of the plausibility check of the side crash. In the accident-free normal state, only the status information which signals a lack of crash-relevant acceleration is transmitted to the sensor unit by both sensors. In addition to a low demand for bandwidth, in this state there is a low demand on the computation capacity of the control unit. The control unit is therefore available for other applications, which is important when the control unit is provided for multiple functions, e.g., in CAPS (Combination Active and Passive Safety) systems.

When low-frequency signals of a low amplitude occur, a plausibility check mode is initiated in which the low-frequency signal components and/or a value derived therefrom, e.g., a window integral, is/are transmitted with high resolution. However, if higher-frequency signals of a high amplitude are detected, they are transmitted as already described and another sensor, which may be on the other side of the vehicle, assumes the plausibility check function.

In the following exemplary embodiment, the analysis according to the present invention and transmission of the signals of a combination sensor for the measurement of pressure and acceleration are described. Such sensors may be used in motor vehicles for detection of side crashes, for example. To this end, they are installed, for example, in mostly closed cavities, e.g., in the area of the side doors of motor vehicles. They include micromechanical sensitive modules for uniaxial or multiaxial detection of accelerations and the ambient pressure. In the case of a side crash in the vicinity of the installation site of the combination sensor, there will initially be a reduction in the volume of the cavity accommodating the combination sensor and, associated with this, a rise in pressure due to the deformation of the body in the contact area.

Determined by the function, the start of the rise in pressure allows the timing of the onset of deformation of the vehicle body. Exceeding a threshold value of the transverse acceleration, which may be displayed according to the exemplary embodiments and/or exemplary methods of the present invention in the form of a plausibility check bit, may be used for the plausibility check of the measured pressure values. At this point in time, it is thus appropriate to divide a data word applied to the data transmitting unit of a combination sensor according to the present invention in such a way that only one bit is used for data obtained from the output variable of the acceleration-sensitive module and the remaining word width available for the data transmission is used for transmission of the data obtained from the output variable of the pressure-sensitive module. Thus only one plausibility check bit is extracted from the acceleration signal and inserted into the output data word, which is used almost completely for the transmission of pressure values. Changes in pressure over time within the cavity equipped with sensors may thus be detected and analyzed with a high resolution. After the end of deformations in the area of the cavity equipped with sensors, there is no further rise in pressure and there is a gradual equalization of pressure with the vehicle surroundings.

However, low-frequency or high-frequency transverse accelerations may still occur in this phase, their analysis being increasingly relevant for determining the exact triggering time of an airbag system. In this phase of a side crash, it is therefore appropriate to make available a larger word width for data obtained from the output variable of the acceleration-sensitive module within the output data word of the signal transmitting unit of the combination sensor. To this end, the output data word may be symmetrically divided or the largest portion of the available word width may be used for transmission of the acceleration values. The change in the division of the output data word may be controlled in an automated procedure by analysis of at least one output variable of a sensitive module. This analysis may be performed internally within the control logic unit itself and/or externally in a control unit and/or by utilizing stored algorithms. These algorithms may be synchronized in an event-controlled manner. For example, it is advantageous to change the allocation of the available word width within the output data word to the particular sensitive modules at a certain point in time after detection of a side crash. In this way, in the case of a combination sensor for measuring pressure and acceleration, the output signals may be transmitted via an interface, with the greatest possible benefit for the entire security system being achieved with little effort.

Such a configuration according to the exemplary embodiments and/or exemplary methods of the present invention of the data transmission is fundamentally flexible, and the division of the word width may also include other division factors. Likewise, a customer-specific selection of different division modes which are adaptable by replacement of programmed EPROMs, for example, is feasible. It is also possible to make the division of the output data word a function of the variations in the signal level of the output variables of the sensitive modules, thus allowing dynamic optimization of data transmission based on the particular individual case. The influence on the transmission parameters according to the present invention may be combined with fixed algorithms that are independent of the signal, e.g., triggering. Partial shifting of signal processing into the sensor itself ensures the possibility of faster system decisions.

The data obtainment according to the exemplary embodiments and/or exemplary methods of the present invention may be supplemented by event-independent methods for sensor query. For example, a cyclical inquiry to the individual sensitive modules of a combination sensor may be performed according to a predefined chronological regimen. Only at the point in time of the start of a crash or immediately before is there a change to the mode with variable division of the available word width of the output data words to be transmitted to ensure maximum system performance using a limited transmission capacity.

What is claimed is:

1. A sensor for obtaining data, comprising:
   at least one sensitive module for quantitatively detecting a parameter to be determined;
   at least one data transmitting unit for transmitting obtained data;
   at least one signal path between the sensitive module and the data transmitting unit; and
   a control logic unit which defines at least one transmission parameter of at least one of the signal path and of the data transmitting unit as a function of at least one output variable of the sensitive module;
   wherein the at least one transmission parameter includes at least one of a word width of an output data word transmitted along the at least one signal path and a transmission interval along the at least one signal path.

2. The sensor of claim 1, wherein the at least one sensitive module includes multiple sensitive modules.

3. The sensor of claim 1, wherein multiple signal paths are included between at least one sensitive module and the data transmitting unit, and the at least one sensitive module includes multiple sensitive modules.

4. The sensor of claim 1, further comprising:
   an acceleration detecting arrangement for detecting accelerations, which is included as a sensitive module.

5. The sensor of claim 1, further comprising:
   an arrangement for detecting pressures is included as a sensitive module.

6. The sensor of claim 1, further comprising:
   an arrangement to define as transmission parameters at least one of an amplification, a filtering, and a digital signal processing of an output variable of a sensitive module, the word width, and the transmission interval.

7. The sensor of claim 1, wherein the control logic unit includes an arrangement which defines at least one transmission parameter of at least one of (i) at least one signal path, and (ii) the data transmitting unit, as a function of a threshold value derived from an output variable of at least one sensitive module.

8. The sensor of claim 1, wherein at least one of the control logic unit and the data transmitting unit includes an arrangement for making available data obtained from output variables of multiple sensitive modules jointly in one output data word.

9. The sensor of claim 8, further comprising:
   an arrangement to set the word width available in an output data word for delivery of the data obtained from the output variables of the individual sensitive modules.

10. A method for providing an output signal of a sensor, which includes at least one sensitive module for quantitatively detecting a parameter to be determined, at least one data transmitting unit for transmitting obtained data, and at least one signal path between the sensitive module and the data transmitting unit, the method comprising:
    sending an output variable of the sensitive module to a control logic unit;
    defining, using the control logic unit, at least one transmission parameter of at least one of the signal path and the data transmitting unit as a function of at least one of the output variable of the sensitive module and a variable derived from the output variable;
    transmitting at least one output variable of the sensitive module via the signal path to the data transmitting unit; and
    delivering at least one output data word containing information about the output variable of the sensitive module to the data transmitting unit for further transmission.

11. The method of claim 10, wherein at least one transmission parameter of at least one of (i) at least one signal path, and (ii) the data transmitting unit is defined as a function of a threshold value derived from the output variable of at least one sensitive module.

12. The method of claim 10, wherein at least one transmission parameter of at least one signal path is defined by selecting a signal path having defined transmission parameters.

13. The method of claim 10, wherein the output variable of an arrangement for detecting accelerations is used as the output variable of a sensitive module, and the absolute value of one of an acceleration and a value of an integral of the acceleration over a time window is used as the variable derived therefrom.

14. The method of claim 10, wherein the output variable of an arrangement for detecting pressures or a variable derived therefrom is used as the output variable of a sensitive module.

15. The method of claim 10, wherein at least one of an amplification, a filtering, and a digital signal processing of an output variable of at least one sensitive module, a word width, and transmission intervals are defined for defining at least one transmission parameter of at least one of (i) at least one signal path and (ii) the data transmitting unit.

16. The method of claim 10, wherein information about parameters detected by two different sensitive modules is integrated into an output data word that is supplied at the data transmitting unit.

17. The method of claim 16, wherein the resolution, with which information about parameters detected by two different sensitive modules is integrated into the output data word, is varied.

18. The method of claim 16, wherein at least one pressure value and at least one acceleration value are integrated into the output data word supplied at the data transmitting unit.

19. A sensor for obtaining data, comprising:
at least one sensitive module for quantitatively detecting a parameter to be determined;
at least one data transmitting unit for transmitting obtained data;
at least one signal path between the sensitive module and the data transmitting unit; and
a control logic unit which defines at least one transmission parameter of at least one of the signal path and of the data transmitting unit as a function of at least one output variable of the sensitive module;
wherein at least one of the control logic unit and the data transmitting unit includes an arrangement for making available data obtained from output variables of multiple sensitive modules jointly in one output data word.

20. The sensor of claim 19, further comprising:
an arrangement to set the word width available in an output data word for delivery of the data obtained from the output variables of the individual sensitive modules.

* * * * *